（12）United States Patent
Mueller et al.

(10) Patent No.: US 12,043,490 B2
(45) Date of Patent: Jul. 23, 2024

(54) BELT CONVEYOR FOR PORTIONED FOOD PRODUCTS

(71) Applicant: ALBERT HANDTMANN MASCHINENFABRIK GMBH & CO. KG, Biberach (DE)

(72) Inventors: Stefan Mueller, Hohentengen (DE); Peter Willburger, Baindt (DE); Georg Bannert, Attenweiler (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 0 days.

(21) Appl. No.: 17/809,539

(22) Filed: Jun. 28, 2022

(65) Prior Publication Data

US 2022/0411194 A1    Dec. 29, 2022

(30) Foreign Application Priority Data

Jun. 29, 2021   (EP) .................................... 21182262

(51) Int. Cl.
*B65G 47/64* (2006.01)
*B65G 15/30* (2006.01)
*B65G 23/12* (2006.01)
*B65G 47/68* (2006.01)

(52) U.S. Cl.
CPC ............ *B65G 15/30* (2013.01); *B65G 23/12* (2013.01); *B65G 2201/0202* (2013.01); *B65G 2203/041* (2013.01)

(58) Field of Classification Search
CPC ........ B65G 15/30; B65G 23/12; B65G 47/64; B65G 47/68; B65G 47/645

USPC ............................................. 198/457.03, 804
See application file for complete search history.

(56) References Cited

U.S. PATENT DOCUMENTS

| | | | | |
|---|---|---|---|---|
| 5,507,134 A | * | 4/1996 | Takeda | B65G 43/08 53/247 |
| 6,280,173 B1 | * | 8/2001 | Suzuki | A23P 30/10 425/451.3 |
| 7,360,348 B2 | * | 4/2008 | Ishii | B65B 57/14 53/493 |
| 8,079,457 B2 | * | 12/2011 | Heinz | B27B 25/04 198/369.1 |

(Continued)

FOREIGN PATENT DOCUMENTS

| | | |
|---|---|---|
| EP | 1719706 A1 | 11/2006 |
| JP | S50147386 U | 12/1975 |

(Continued)

*Primary Examiner* — Douglas A Hess
(74) *Attorney, Agent, or Firm* — McCoy Russell LLP

(57) ABSTRACT

A belt conveyor comprises a belt with a drive roller, a deflection roller that can be adjusted relative thereto upwardly and/or downwardly, and an upper run extending therebetween for transporting the food products. The belt conveyor comprises a deflection element arranged between the drive roller and the deflection roller and configured for adjustment in the direction of transport. The upper and/or the associated lower run of the belt transitions from a first longitudinal section running in the direction of transport to a second longitudinal section tilted relative thereto when the deflection roller has been adjusted. The second longitudinal section can be quickly tilted and flexibly adapted to the dimensions of the food products and their transport distances inbetween.

17 Claims, 6 Drawing Sheets

(56) References Cited

U.S. PATENT DOCUMENTS

| | | | |
|---|---|---|---|
| 8,678,170 B2 * | 3/2014 | Carrara | B65G 47/71 |
| | | | 198/352 |
| 8,752,691 B2 * | 6/2014 | Cristoforetti | B65G 47/647 |
| | | | 198/589 |
| 8,752,816 B2 * | 6/2014 | Oz | B43M 3/04 |
| | | | 198/588 |
| 9,090,411 B2 * | 7/2015 | Byrne | B65G 57/03 |
| 10,597,238 B2 * | 3/2020 | Schroeder | B65G 47/5145 |

FOREIGN PATENT DOCUMENTS

| | | | |
|---|---|---|---|
| JP | H08268542 A | | 10/1996 |
| JP | 2003310230 A | | 11/2003 |
| JP | 2009137690 A | | 6/2009 |
| JP | 2018165192 A | | 10/2018 |
| NL | 1024194 | * | 8/2003 |
| WO | 2005021410 A1 | | 3/2005 |

* cited by examiner

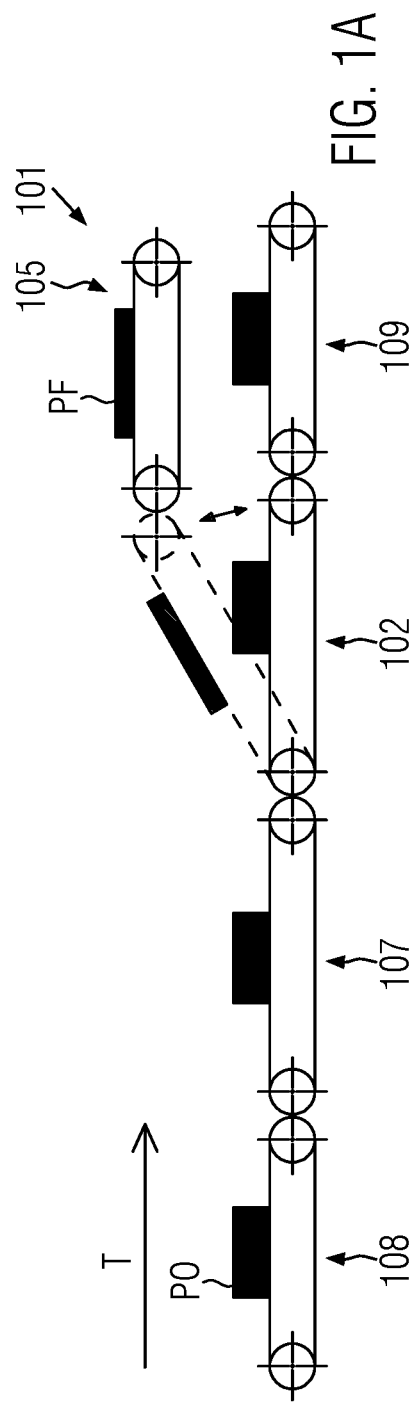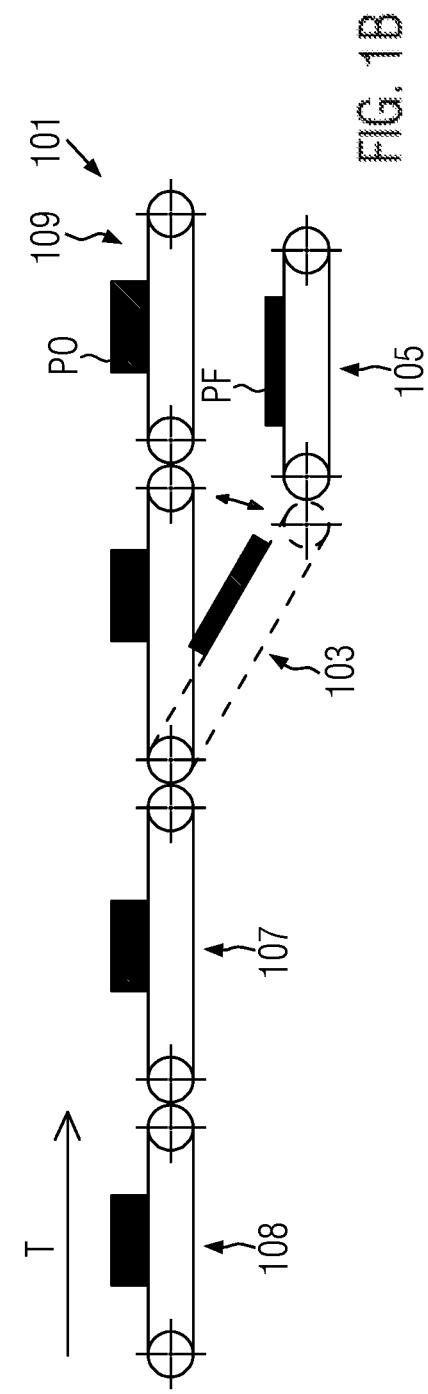

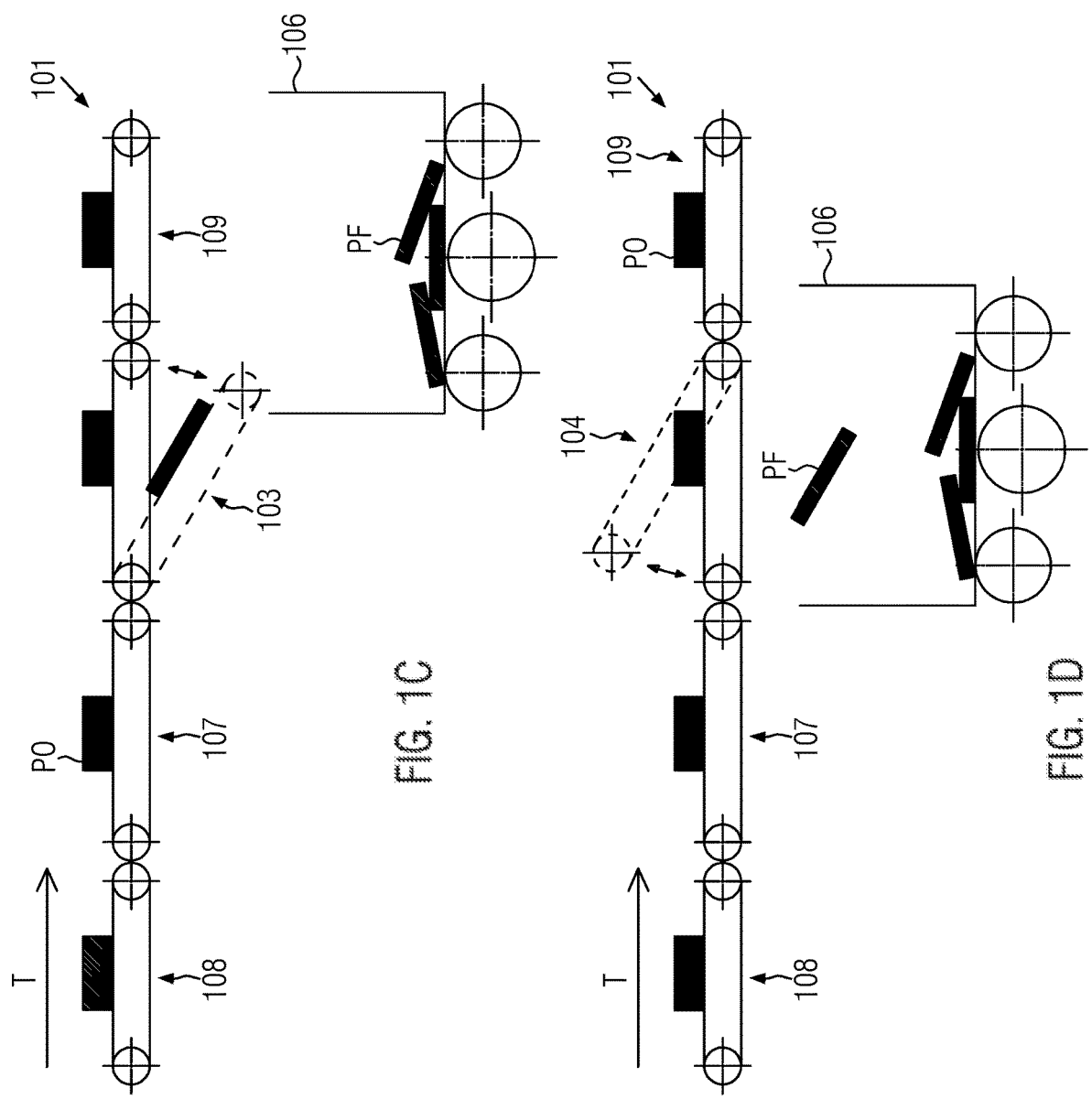

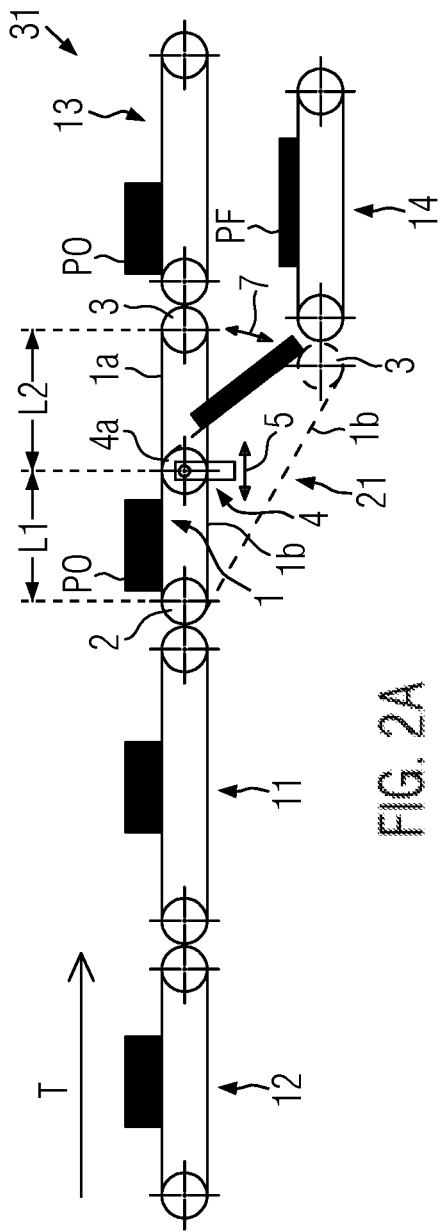
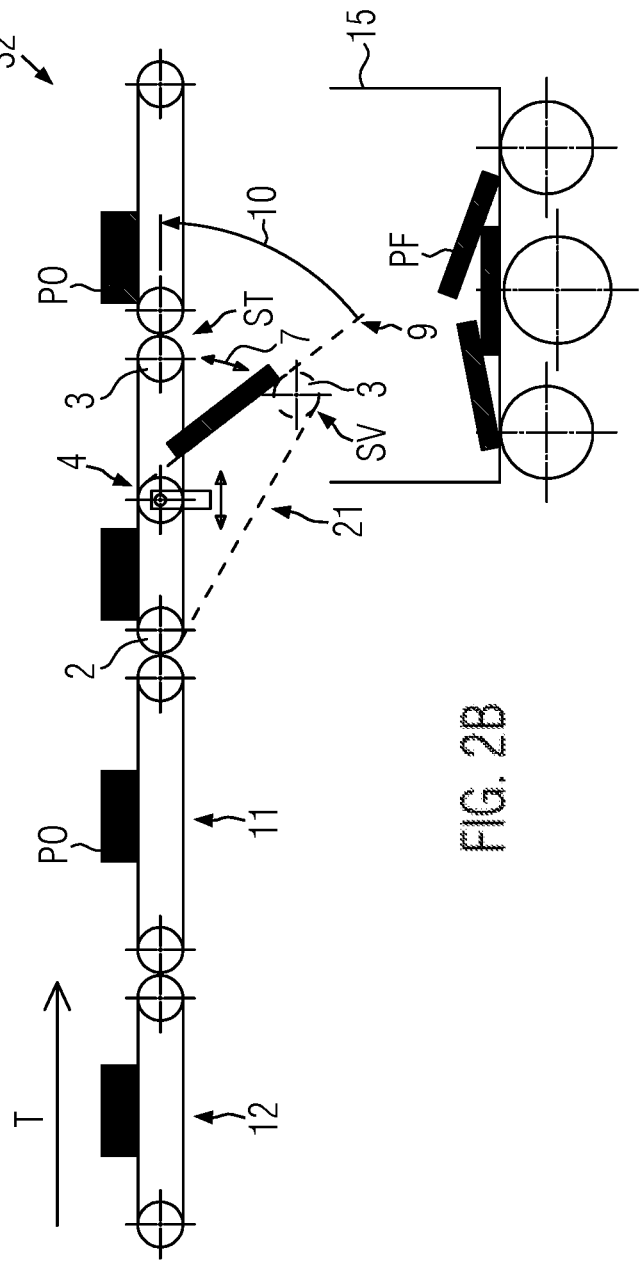
FIG. 2A
FIG. 2B

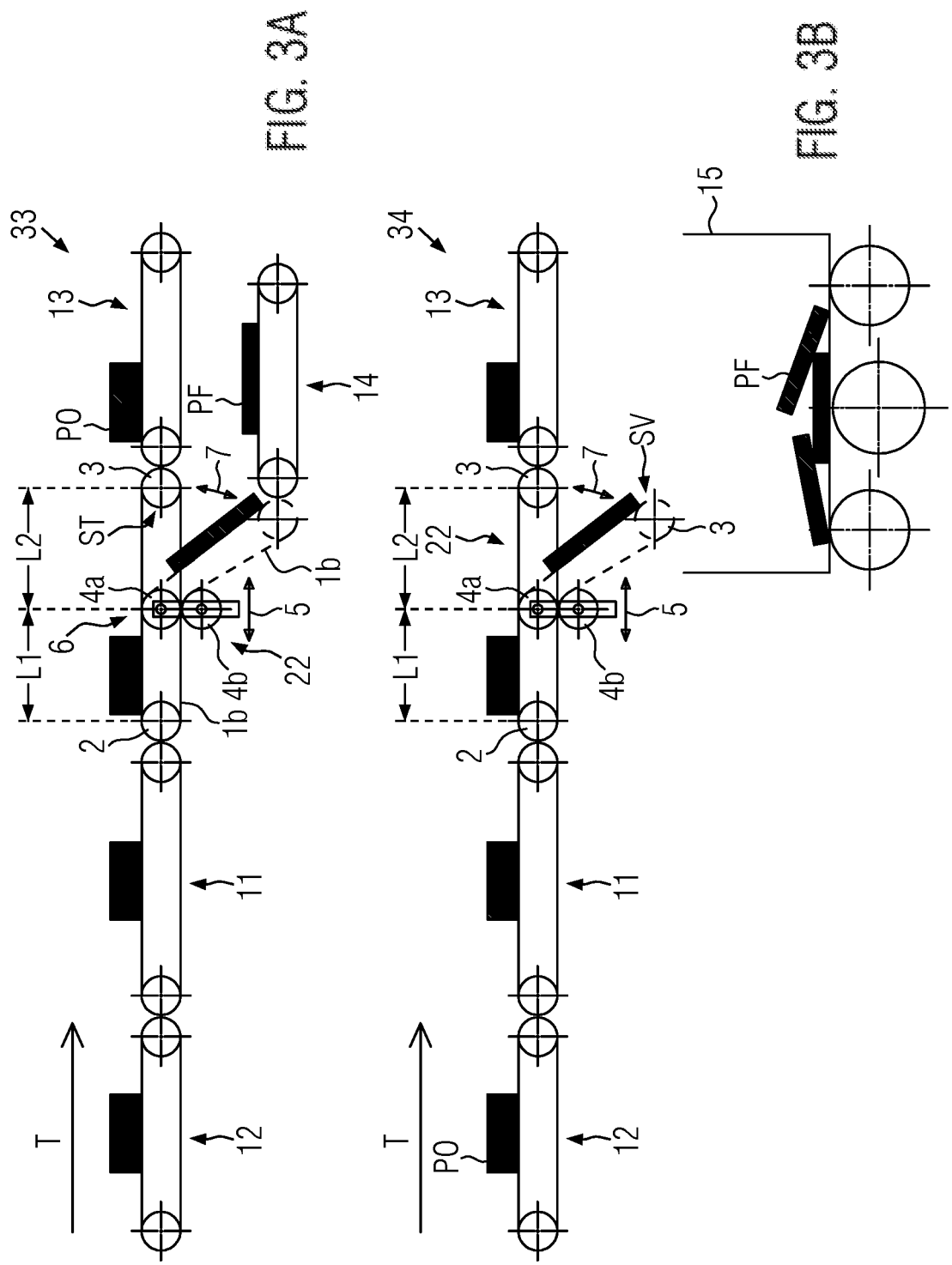

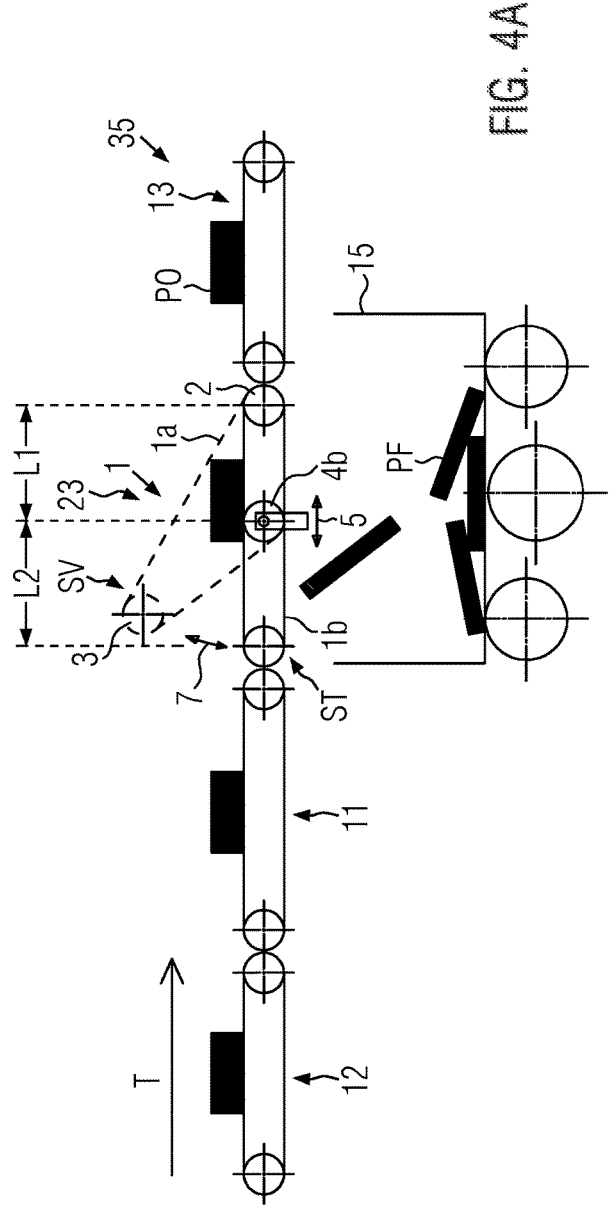
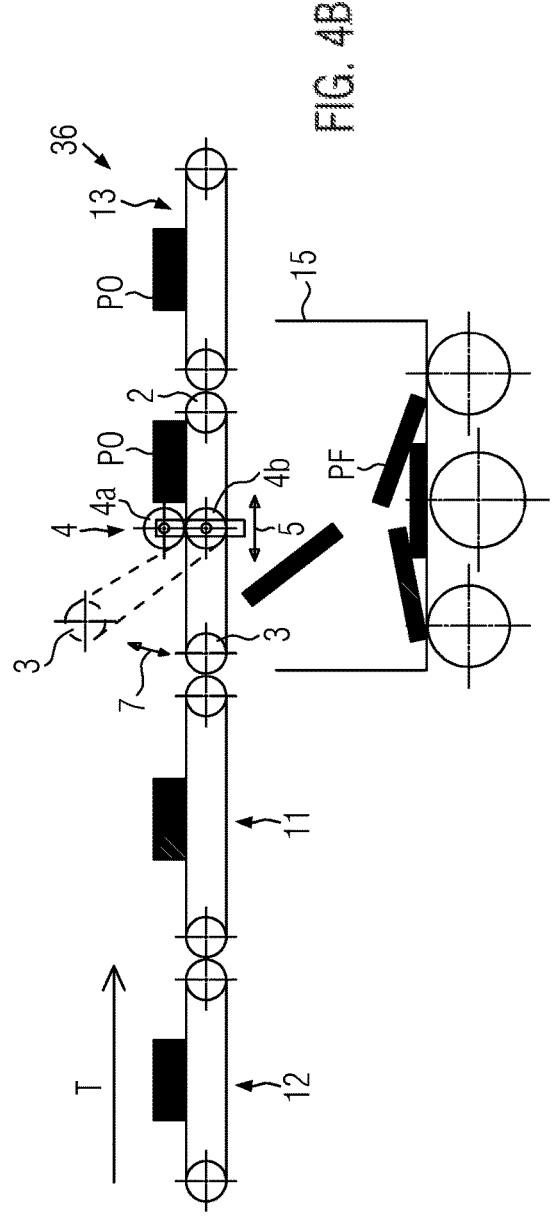

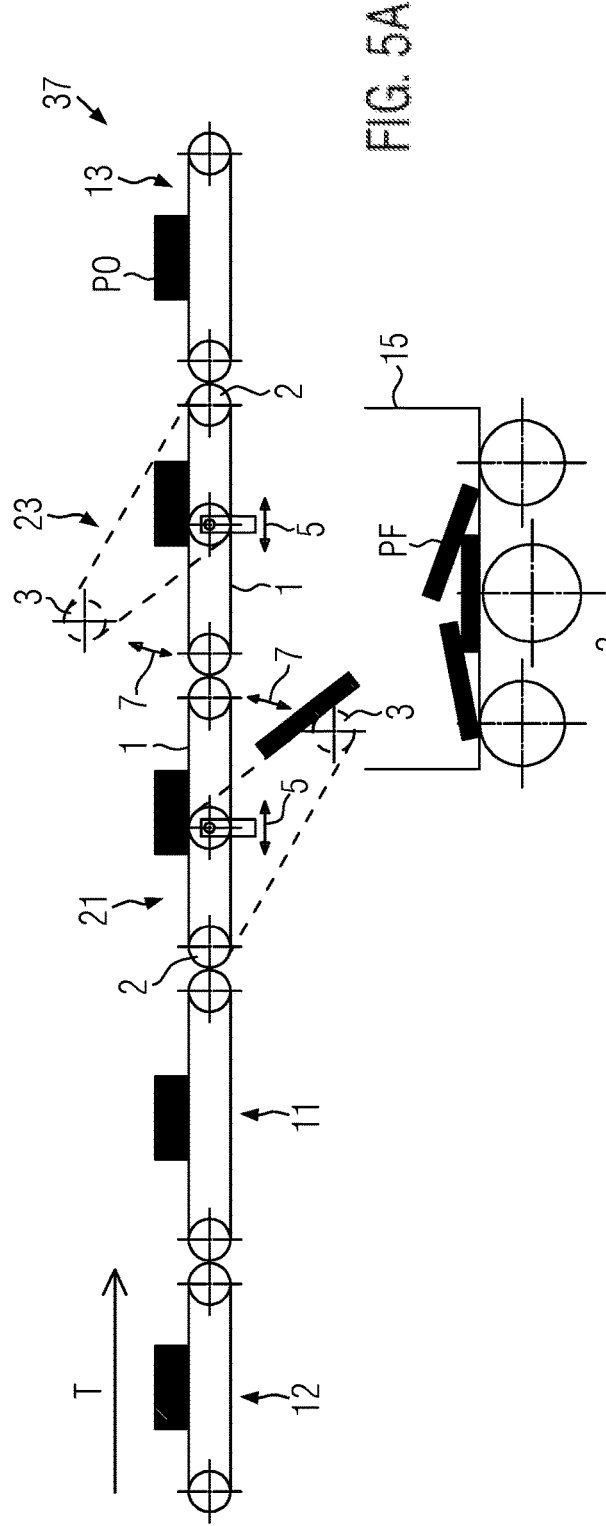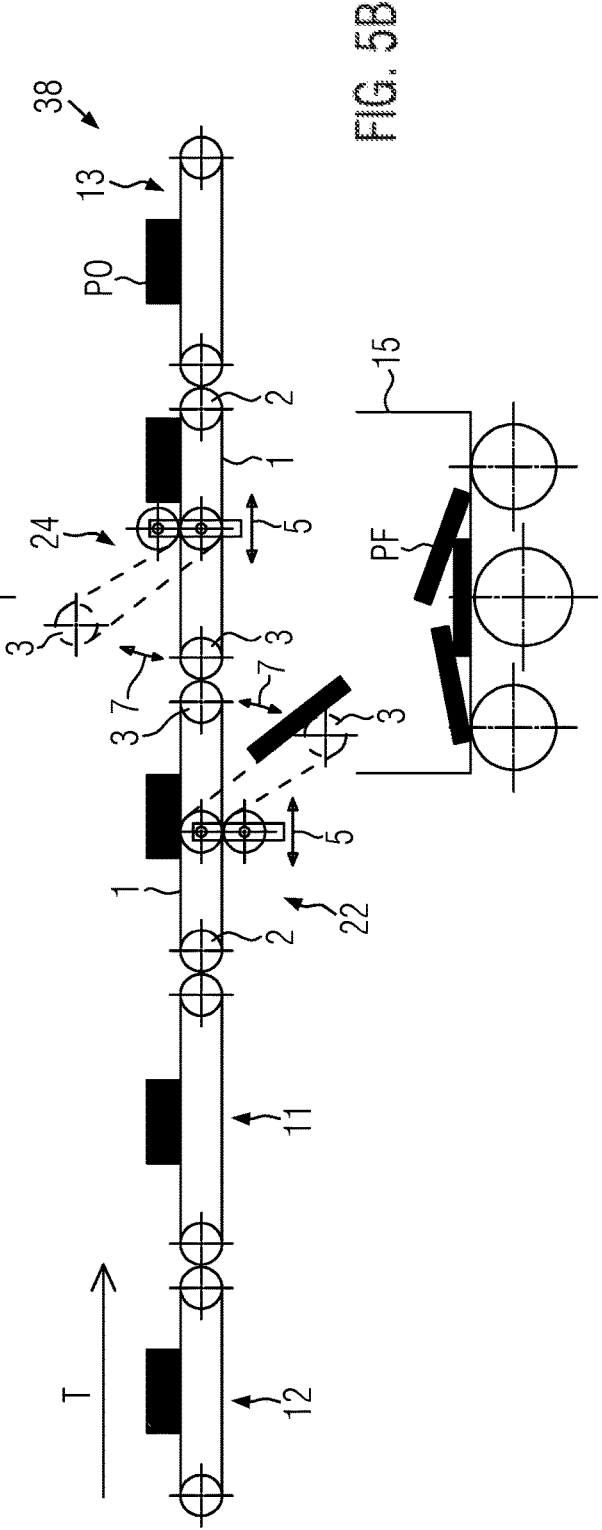

BELT CONVEYOR FOR PORTIONED FOOD PRODUCTS

CROSS-REFERENCE TO RELATED APPLICATION

The present application claims priority to European Patent Application No. 21182262.2 filed on Jun. 29, 2021. The entire contents of the above-listed application is hereby incorporated by reference for all purposes.

TECHNICAL FIELD

The disclosure relates to a belt conveyor for portioned food products.

BACKGROUND AND SUMMARY

Portioned food products, such as fresh minced meat, burgers, patties or the like, are known to be produced in production lines in which the individual portions are fed on belt conveyors to a packaging device. As is known, for example, the weights of the packaged portions must comply with the prepackages regulation. For this purpose, quality assurance tests must be carried out during ongoing production. The packaged food products must also be harmless for consumption, which means, for example, that they may not contain any foreign objects. Accordingly, the individual portions are monitored by sensors as required in the region of the production lines in order to then discharge faulty portions from the ongoing production process. For this purpose, for example, the weight, the shape, the color, and/or the presence of foreign objects can be monitored. This usually takes place in what are known as continuous inspection units, such as continuous scales, in which the individual portions are inspected in continuous flow, i.e. without halting the transport of the food products.

Food products identified to be faulty are to be discharged from the product flow, where a detected fault is, for example, underweight, an unacceptable shape and/or color, and/or the presence of unacceptable foreign objects in the food product. The continuous inspection can be carried out accordingly by weighing, imaging inspection, scanning of the food products, transillumination, and/or metal detection. A discharge device is then positioned downstream of such continuous inspections in which, for example, portions that are too light or too heavy are discharged from the product flow and are therefore not packaged.

According to FIGS. 1A to 1D, such a discharge device 101, known from internal prior art to be generic, comprises at least one belt conveyor 102, 103, 104 which can be pivoted upwardly or downwardly with respect to direction of transport T for discharging individual faulty portions PF from the product flow of correct portions PO. In this way, faulty portions PF can be fed to a discharge belt 105 and/or to a collection container 106. For better understanding, a continuous inspection device 107 positioned upstream of respective belt conveyor 102, 103, 104, a feed belt 108 again upstream thereof, and a discharge belt 109 downstream of belt conveyor 102, 103, 104 are furthermore shown schematically in FIGS. 1A to 1D. It can also be seen that it is possible for discharging to pivot the end of belt conveyor 102, 103 on the outlet side upwardly or downwardly or to pivot up the end of the belt conveyor 104 on the input side.

The object underlying the disclosure arises from the fact that portioned food products, hereinafter also referred to as portions for the sake of simplicity, must be individually inspected in the continuous inspection device, for example, by weighing them, and in the event of faults must be discharged individually without undesirably impairing the transport of immediately leading or trailing portions. On the one hand, the belt conveyor should be deflected as early as possible for discharging a faulty portion PF in favor of the highest possible production output. On the other hand, this is only possible when a leading correct portion PO has substantially left the respective belt conveyor. In addition, the latter can only be moved back from its angled discharge position to its transport position running in direction of transport T when the faulty portion PF has left it, where a subsequent correct portion PO may not have advanced too far into the region of the belt conveyor that is still angled.

Minimum distances between the individual portions must therefore be maintained both during the continuous inspection as well as when discharging faulty portions PF of food products.

The disadvantage there is that the production output, i.e. the number of food products produced per unit of time, is undesirably limited in prior art in favor of the reliable discharge of faulty portions PF and product-friendly and reliable transportation of correct portions PO. In addition, the conventional discharge devices must be configured for the most critical food product in terms of its handling, i.e. generally for the largest portion PO to be produced. A higher production output that is actually possible with food products that are less critical in this respect cannot be achieved due to this limitation.

There is therefore a need for belt conveyors for discharge devices or similar distribution devices that enable reliable operation at a higher production output and/or flexible adaptation to different food products and portion sizes The belt conveyor is used to transport portions of food products, in particular meat products and/or pasta. The belt conveyor comprises a conveyor belt, an associated drive roller, and a deflection roller that can be adjusted upwardly and/or downwardly relative thereto, where the upper run of the conveyor belt extends from the drive roller to the deflection roller and is arranged to transport the portions.

According to the disclosure, the belt conveyor comprises a deflection element which is arranged between the drive roller and the deflection roller and can be adjusted in the direction of transport and at which the upper run and/or the associated lower run of the conveyor belt transitions from a first longitudinal section extending in the direction of transport to a second longitudinal section angled relative thereto upwardly/downwardly when the deflection roller has been adjusted upwardly/downwardly.

The upper run and/or lower run in the first longitudinal section therefore extends permanently in the direction of transport and can be adjusted from there in the second longitudinal section to a distribution direction differing therefrom, and in particular to a discharge direction.

The distribution direction can channel individual correct portions of the food product in the sense of a product diverter selectively to a discharge conveyor belt which in the distribution position is disposed downstream for further processing as well as discharge faulty portions to a respectively downstream discharge belt or to a collection container.

If the second longitudinal section is angled upwardly/downwardly, the belt conveyor assumes a distribution position or a discharge position; if the second longitudinal section is not angled upwardly/downwardly then the belt conveyor assumes a conventional transport position for the onward transportation of correct portions of the food product.

Since only the second longitudinal section is angled upwardly/downwardly in the distribution position/discharge position, the first longitudinal section can meanwhile receive a trailing portion or a leading portion, depending on whether the first longitudinal section when viewed in the direction of transport is arranged upstream or downstream of the second longitudinal section. As a result, the transport distance between successive portions of the food product in the region of the distribution device can be reduced and consequently the production output can be increased.

In addition, the longitudinal position of the deflection element between the drive roller and the deflection roller can be adapted to the dimensions of the food product to be processed. Consequently, distribution processes and/or discharge processes for individual food products can be optimized in a manner specific to the product and the production output can be maximized accordingly.

The deflection element may comprise a first intermediate roller for deflecting/segmenting the upper run and/or a second intermediate roller for deflecting/segmenting the lower run. This means that the upper run and/or lower run, which in the distribution position is angled, runs over the respectively associated intermediate roller and is deflected there.

The first longitudinal section therefore extends from the drive roller to the deflection element/to the associated intermediate roller. The tiltable second longitudinal section extends from there to the deflection roller. The first and/or second intermediate roller enables the conveyor belt to be defected in a low-friction and material-friendly manner and to be angled in sections.

Alternatively, the deflection element can also be configured to be a molded part which is rounded off with suitable deflection radii and at which the conveyor belt is deflected at the transition from the first to the second longitudinal section. For this purpose, the molded part can be made of a plastic material with comparatively good sliding properties and/or comprise a respective deflection surface, for example, made of PTFE or polyamide.

The deflection element may be arranged in a vertically fixed position, i.e. it can be adjusted only horizontally.

In the context of the present disclosure, directional information such as "up", "down", "vertical" and "horizontal" always relates to a direction of transport that is assumed to be horizontal for the sake of simplicity.

The distance between the drive roller and the deflection roller in the direction of transport may be fixed so that, by adjusting the deflection element, the lengths of the first and the second longitudinal sections change in opposite directions and add up to a constant.

For example, the length of the tiltable second longitudinal section can be set to be relatively short for relatively short transport distances between the portions and/or for comparatively high transport speeds in order to prevent a trailing portion from being hurled away when the second longitudinal section is returned to its transport position. In other words, the distances between individual portions of the food product can be minimized without disrupting the transport of respectively leading or trailing portions by discharging or otherwise distributing a specific portion.

In other words, a portion to be discharged dwells only relatively briefly on the correspondingly minimized second longitudinal section so that the latter can be quickly returned to its transport position. When the second longitudinal section is minimized, the dwell time of a leading portion on the second longitudinal section is also comparatively short. This also contributes to an increase in production output with the belt conveyor according to the disclosure.

The first and the second intermediate rollers may be arranged such that they can be adjusted together in the direction of transport. This enables a comparatively simple adjustment process, both manually and possibly by machine, and promotes the fact that both the length of the upper run as well as the length of the lower run remain substantially constant when the second longitudinal section is adjusted.

Alternatively, the first and the second intermediate rollers can be arranged such that they can be adjusted individually/separately in the direction of transport. As a result, changes in length of the upper run and/or lower run can be prevented or at least reduced when changing between the transport position and the distribution position, for example if the conveyor belt is not configured to be elastic or exhibits only relatively low elasticity.

In some embodiments, the belt conveyor also comprises an actuating drive for the adjustment of the deflection element by machine in the direction of transport. An associated control device can then adjust the belt conveyor in an automated manner to the respective production conditions, such as the portion size of the food product to be processed, in that the deflection element is moved in an automated manner to a suitable longitudinal position. In principle, this is also possible during ongoing production operations, for example, for adapting the longitudinal position of the deflection element to different/varying transport distances between individual portions.

It is also advantageous that only the second longitudinal section needs to be moved when the conveyor belt is angled while the first longitudinal section is permanently arranged in a stationary position. As a result, only a relatively small mass needs to be accelerated when moving to an angled position, as a result of which comparatively quick adjustment motions are made possible.

In principle, however, manual adjustment of the deflection element would also be practicable. Comparatively simple adjustment mechanisms are then possible.

The belt conveyor may comprise a programmable and position-controlled actuating drive for adjusting the position of the deflection roller for angling the second longitudinal section. For example, A servo-controlled actuating drive is suitable for this purpose. In this way, for example, a setting angle of the second longitudinal section can be adjusted in an automated manner by an associated control device to the respective food product to be processed. For example, the setting angle for comparatively low food products can be kept comparatively small in order to enable positioning processes that are as fast as possible and discharge processes that are as short as possible.

In a further advantageous embodiment, the belt conveyor comprises a mechanical stop, which is in particular adjustable, for limiting an setting angle of the second longitudinal section. This enables comparatively simple and yet reproducible angled positioning of the second longitudinal section. In addition, such a mechanical stop can be combined with a non-position-controlled actuating drive, such as with a pneumatic cylinder. Comparatively simple drive devices can then be employed for the deflection roller and the second longitudinal section.

The belt conveyor may comprise a pivoting mechanism for adjusting the deflection roller/for angling the second longitudinal section. A pivoting mechanism is relatively easy to construct and operate. In principle, however, linear lifting mechanisms for the deflection roller and/or guiding the deflection roller along a suitably extending trajectory would also be conceivable.

In some embodiments, the belt conveyor furthermore comprises a programmable drive control device for selectively operating the drive roller at at least two different transport speeds. The speed of the conveyor belt can therewith be changed temporarily in a selective manner, for example, during a discharge process, for example, for optimizing certain product-specific discharge processes. The speed of the conveyor belt can also be temporarily increased or decelerated during ongoing production operations, for example, to equalize the distances between individual portions.

The conveyor belt may be configured to be elastic, for example, as a strap, such that its length adapts to a change in length of its upper run or lower run caused when the second longitudinal section is adjusted. For example, the length of an upper run or lower run that does not run around the deflection element can be temporarily shortened when angled. The elastic conveyor belt could then be kept under tension in its transport position such that there is still sufficient belt tension for the then shorter conveyor belt to run reliably, also in the distribution position.

As an alternative to an elastic conveyor belt, the use of a deflection element with two intermediate rollers arranged one above the other is particularly suitable, which deflect both the respective upper run and the respective lower run of the conveyor belt at the transition from the first to the second longitudinal section. As a further alternative, a tensioning mechanism for the conveyor belt to compensate for the change in length that arises during the adjustment is also conceivable.

The conveyor belt may be configured as a link chain that is rigid transverse to the direction of transport. For the deflection of the upper run/lower run at the deflection element, the latter does not then need to extend across the entire width of the conveyor belt. In this case, for example, only comparatively narrow intermediate rollers or molded parts are required for the two lateral edge regions of the link chain.

The second longitudinal section can be angled by adjusting the deflection roller downwardly and is then arranged downstream of the first longitudinal section, or the second longitudinal section can be angled by adjusting the deflection roller upwardly and is then arranged upstream of the first longitudinal section. This promotes reliable forwarding of correct portions and a simple discharge of faulty portions.

The belt conveyor described can be part of a distribution device for portions of food products, where the distribution device then furthermore comprises an upstream continuous inspection device for the portions, in particular with a continuous scale and/or a camera and/or a scanner for optically scanning the portions. The distribution device then furthermore comprises a control device for adjusting the deflection roller and/or the deflection element in an automated manner and in dependence of an inspection result of the continuous inspection device. For example, discharge processes or distribution processes can be triggered and/or optimized therewith in an automated manner in dependence of inspection results.

The belt conveyor according to at least one of the embodiments described may be part of a distribution device for portions of food products, where the distribution device then furthermore comprises a discharge belt and/or a collection container for faulty portions downstream of the tiltable second longitudinal section in its distribution position/discharge position. The distribution device can then also be referred to as a discharge device.

According to at least one of the embodiments described, the belt conveyor may be a component of a distribution device for portions of food products, where the distribution device then furthermore comprises a first discharge belt which is positioned downstream of the tiltable second longitudinal section in its transport position that is not angled, and a second discharge belt which is positioned downstream of the tiltable second longitudinal in its discharge position that is angled. The distribution device can then also be understood to be a sorting device or product diverter for the portions. In principle, several belt conveyors could also be combined to one distribution device to distribute food products to different discharge belts.

BRIEF DESCRIPTION OF THE FIGURES

Certain embodiments of the disclosure shall be illustrated by way of drawings, where:

FIGS. 1A to 1D show distribution devices with belt conveyors according to prior art;

FIGS. 2A and 2B show distribution devices with a first embodiment of the belt conveyor according to the disclosure;

FIGS. 3A and 3B show distribution devices with a second embodiment of the belt conveyor according to the disclosure;

FIGS. 4A and 4B show a distribution device with a third and fourth embodiment of the belt conveyor according to the disclosure; and FIGS. 5A and 5B show a distribution device with a fifth and sixth embodiment of the belt conveyor according to the disclosure.

DETAILED DESCRIPTION

As is evident from FIG. 2A, belt conveyor 21 according to a first embodiment comprises a conveyor belt 1 with a drive roller 2 and a deflection roller 3 adjustable downwardly relative thereto. Conveyor belt 1 comprises an upper run 1a and a lower run 1b, each of which extends from drive roller 2 to deflection roller 3.

Belt conveyor 21 furthermore comprises a deflection element 4 arranged between drive roller 2 and deflection roller 3 for dividing conveyor belt 1 into a first longitudinal section L1 running permanently in direction of transport T and into a second longitudinal section L2 that can be angled (tilted) relative thereto by machine in the longitudinal direction.

In the case of belt conveyor 21 of the first embodiment, only upper run 1a of conveyor belt 1 is divided into longitudinal sections L1 and L2. As shall be described further hereafter, depending on the mode of operation, embodiments are also possible in which both upper run 1a and lower run 1b or only lower run 1b are divided accordingly.

Associated with deflection element 4 is an adjustment mechanism 5 (indicated by a double arrow) for adjusting a longitudinal position 6 of deflection element 4 between drive roller 2 and deflection roller 3. Deflection element 4 may be adjusted exclusively parallel to direction of transport T, i.e. only horizontally, where direction of transport T is assumed to be horizontal for the sake of simplicity.

In the case of belt conveyor 21 of the first embodiment, deflection element 4 comprises a first intermediate roller 4a along which upper run 1a runs, and first longitudinal section L1, which is permanently oriented in direction of transport T, transitions to tiltable second longitudinal section L2.

Belt conveyor 21 is shown in solid lines in a transport position ST in which second longitudinal section L2 is oriented parallel to direction of transport T, as well as in dashed lines in a distribution position SV in which second longitudinal section L2 is angled relative thereto extending downwardly with respect to direction of transport T, see the associated designation in FIG. 2B.

It can also be seen in FIG. 2A that lower run 1b is not divided by deflection element 4 in the first embodiment, but runs in a straight line from deflection roller 3 to drive roller 2 both in transport position ST as well as in distribution position SV and is therefore shorter in distribution position SV than in transport position ST. Conveyor belt 1 can then be configured to be elastic in order to compensate for this difference in length. In addition or as an alternative, a tensioning mechanism (not shown) for conveyor belt 1 to compensate for this difference in length is also conceivable.

In FIG. 2A, an adjustment mechanism 7 for deflection roller 3 for its adjustment between transport position ST and distribution position SV of belt conveyor 21 is also indicated schematically (by a double arrow).

Adjustment mechanism 7 can be configured and driven in different ways. For example, it can comprise a pivoting lever on which deflection roller 3 is mounted and is guided along a circular arc between transport position ST and distribution position SV. Actuating mechanism 7 could instead also comprise a rail-like curved guide with which deflection roller 3 could optionally also be guided between transport position ST and distribution position SV along a path of motion deviating from a circular path. In addition, an adjustment mechanism 7 with a linear guide for deflection roller 3 between transport position ST and distribution position SV would be conceivable. The structure of such adjustment mechanisms 7 is known in principle and is therefore not illustrated.

A position-controlled motor, such as a servo motor, is particularly suitable as the actuating drive (not shown) for actuating mechanism 7 and deflection roller 3. This means that different distribution positions SV can be specified by an associated control device 8. Deflection roller 3 can then be moved variably by way of the position-controlled drive to a distribution position SV that is respectively adapted to the portion size to be processed.

As an alternative thereto, it is also conceivable to use a non-controlled actuating drive for actuating mechanism 7 and deflection roller 3 and, for example, to combine it with a mechanical stop 9 for distribution position SV. Its position could be, for example, manually adjustable for setting distribution position SV to match the respective product size/portion size. In combination with stop 9, for example, a pneumatic cylinder would be suitable for moving deflection roller 3 between transport position ST and distribution position SV.

Second longitudinal section L2 can be set/tilted to a defined setting angle 10 (see FIG. 2B) with respect to direction of transport T using the actuating drive and actuating mechanism 7. Different distribution positions SV can be assumed, for example, by moving in an automated manner to setting angles 10 respectively associated in control device 8 or by adjusting stop 9 accordingly.

For the sake of completeness, FIG. 2A shows the following components, known in principle, of a first distribution device 31 comprising belt conveyor 21: a continuous inspection unit 11 which is arranged upstream of belt conveyor 21 and which can comprise, for example, a continuous scale; a feed belt 12 upstream thereof; a discharge belt 13 in its transport position ST positioned downstream of belt conveyor 1 for correct portions PO of food products; and a distribution belt 14 which is positioned downstream of belt conveyor 1 in its distribution position SV and which could in principle be associated with different tasks.

Distribution belt 14 can be (as shown) a discharge belt for faulty portions PF of a food product, a further discharge belt for correct portions PO of the same food product, or for portions of another food product, for example, to feed downstream packaging machines in parallel. Distribution device 21 can therefore be used either to discharge faulty products, to split up homogeneous product flows, or to sort heterogeneous product flows.

Shown in the figures by way of example for the sake of simplicity are correct portions PO as well as faulty portions PF of a food product. In principle, any criteria could be examined in continuous inspection unit 11 in order to distinguish between correct portions PO and/or faulty portions PF of a uniform food product or different food products. Monitoring methods suitable for this purpose are known in principle and are therefore not explained in detail.

Drive roller 2 may be associated with a drive motor (not shown) with a speed that can be set by control device 8. For example, a transport speed adapted to the respective portion size and/or to transport distances between successive portions PO, PF can then be set. The transport speed can then also be adapted individually to different portion sizes and/or transport distances during the ongoing production process.

The functions described above can in principle be implemented in the same way in the embodiments described hereafter.

FIG. 2B shows distribution device 32 according to a second embodiment which is configured exclusively as a discharge device. Although belt conveyor 21 according to the first embodiment is also present in this case, distribution belt 14, however, has been replaced by a collection container 15 for faulty portions PF. It would also be conceivable to first guide faulty portions PF onto a distribution belt 14 and to then collect them in collection container 15.

As can be seen in FIG. 3A, deflection element 4 in a belt conveyor 22 of a second embodiment comprises a second intermediate roller 4b which can be adjusted together with first intermediate roller 4a in direction of transport T between drive roller 2 and deflection roller 3, as has already been explained above.

The main difference to belt conveyor 21 of the first embodiment is that lower run 1b of conveyor belt 2 is additionally divided into first longitudinal section L1 running permanently in direction of transport T and second longitudinal section L2 that can be angled relative thereto. This is caused by the guidance/deflection of lower run 1b at second intermediate roller 4b.

While the deflection function of first intermediate roller 4a for upper run 1a of conveyor belt 1 is not influenced by second intermediate roller 4b, it causes lower run 1b to have its length between drive roller 2 and deflection roller 3 not increase overall or at least significantly less than is the case without second intermediate roller 4b, even when second longitudinal section L2 is angled.

As FIGS. 2A and 3A show in comparison in this regard, lower run 1b in the first embodiment shortens when moving to distribution position SV as compared to transport position ST. This can be compensated for without second intermediate roller 4b, for example, in that conveyor belt 1 is so elastic overall that it adapts to the change in length of lower run 1b between transport position ST and distribution position SV, or by a tensioning mechanism (not shown) for conveyor belt 1.

In contrast, second intermediate roller 4b provides the advantage that conveyor belt 1 does not need to exhibit any elastic properties, or only to a small extent, since no significant change in length of lower run 1b between transport position ST and distribution position SV has to be compensated for.

If second intermediate roller 4b is present, then a link chain that is rigid in the transverse direction could be used for conveyor belt 1 and which only has to be guided by the associated drive and deflection rollers 2, 3 as well as deflection element 4 in its two lateral edge regions.

Belt conveyor 22 according to the second embodiment is, for example, part of a distribution device 33 according to a third embodiment with a distribution belt 14 on the outlet side (in analogy to FIG. 2A).

FIG. 3B shows the replacement of distribution belt 14 on the outlet side by a possibly also movable collection container 15 for faulty portions PF in a distribution device 34 according to a fourth embodiment, which corresponds in principle to FIG. 2B with the exception of belt conveyor 22 with two deflection rollers 2, 3 and is also configured as a discharge device.

As can be seen in FIGS. 4A and 4B, belt conveyor 23, 24 according to a third and fourth embodiment can comprise a second longitudinal section L2 that can be angled upwardly, for which purpose at least lower run 1b of deflection element 4 can be divided into first longitudinal section L1 running permanently in direction of transport T and tiltable second longitudinal section L2. Belt conveyors 23, 24 that can be angled upwardly are components of distribution devices 35, 36 according to a fifth and sixth embodiment, respectively.

In the case of belt conveyors 23, 24, deflection element 4 comprises second intermediate roller 4b along which lower run 1b runs and first longitudinal section L1 transitions to tiltable second longitudinal section L2.

Belt conveyor 24 of the fourth embodiment differs from belt conveyor 23 of the third embodiment again only by an additional intermediate roller which presently is first intermediate roller 4a associated with upper run 1a.

Belt conveyors 23, 24 are also shown in solid lines in transport position ST, in which tiltable second longitudinal section L2 is oriented parallel to direction of transport T, and in dashed lines in angled distribution position SV.

While entire upper run 1a of belt conveyors 21, 22 with second longitudinal section L2 that can be angled downwardly has a transport function both in transport position ST as well as in distribution position SV, this is the case only in transport position ST for belt conveyors 23, 24 shown in FIGS. 4A and 4B with second longitudinal section L2 that can be angled upwardly. In distribution position SV, on the other hand, faulty portions PF to be discharged are not to reach upper run 1a and any correct portions PO that may be running ahead of them are not be impaired in any way by the angled position and in particular should not be hurled away.

Distribution position SV is presently used exclusively for discharging faulty portions PF. Lower run 1b is therefore angled upwardly in second longitudinal section L2 such that faulty portions PF of the food product to be discharged do not reach raised deflection roller 3, but drop down therebeneath, for example, into a collection container 15 that is made available.

This means that the distribution function is then substantially only effected by deflecting lower run 1b of conveyor belt 1 in sections, while upper run 1a is guided such that portions PO possibly leading thereon can also be reliably transported in distribution position SV or already have left upper run 1a.

This can be promoted by additional intermediate roller 4a, since the upper run in first longitudinal section L1 is then permanently oriented in direction of transport T and leading portions PO thereon cannot be impaired in distribution position SV, or can only be impaired comparatively briefly.

Belt conveyors 23, 24 that can be angled upwardly can be viewed as both horizontally and vertically mirrored variants of belt conveyors 21, 22 that can be angled downwardly.

Accordingly, second longitudinal section L2 that can be tilted upwardly, i.e. when conveyor belt 1 can be angled upwardly, may be arranged upstream of first longitudinal section L1 which is oriented permanently in direction of transport T; the opposite may be the case for conveyor belt 1 which can be angled downwardly. These constellations are particularly advantageous for the reliable transport of portions PO, PF. Deviations therefrom would be possible in principle, for example, a second longitudinal section L2 inclined relatively gently in the direction of flow in distribution position SV for the distribution of relatively flat food products.

All of the components of belt conveyor 21, 22 and distribution devices 31 to 34 shown with reference to FIGS. 2A to 3B as well as their functions can in principle be present in the same way in the mirrored arrangement in the above sense. The actuating functions and control functions described are therefore possible in all embodiments disclosed and are therefore not mentioned again in individual cases and/or denoted in the figures.

It can be seen in FIGS. 4A and 4B that the arrangement with second longitudinal section L2 that can be angled (tilted) upwardly is primarily suitable for discharging faulty portions PF because they drop down immediately before or beneath belt conveyor 23,24 when moving to distribution position SV (again illustrated in dashed lines).

A second longitudinal section L2 that can be angled (tilted) downwardly is in contrast primarily suitable for gentle transportation of correct portions PO and possibly their distribution to different discharge belts and/or distribution belts 13, 14, so that portions PO, PF to be distributed are for the most part resting on upper run 1a of conveyor belt 1.

FIGS. 5A and 5B illustrate that belt conveyors 21, 22 with a second longitudinal section L2 that can be angled downwardly and belt conveyors 23, 24 that are mirrored in this regard with a second longitudinal section L2 that can be angled upwardly can also be combined in pairs disposed one behind the other, for example, in distribution devices 37, 38 shown according to a seventh and eighth embodiment, which again are primarily configured as discharge devices.

The two belt conveyors 21 to 24 respectively disposed one behind the other may then be controlled separately from one another so that different adaptation options exist depending on portions PO, PF of food products to be transported onward or to be sorted out. This means that deflection rollers 3 of individual belt conveyors 21 to 24 can be adjusted as required simultaneously or also one after the other between transport position ST and distribution position SV. For example, in this way it is possible to react better to heavily fluctuating transport distances between individual portions PO, PF.

During production operation, continuous inspection unit 11 allows in principle both the ongoing portion-by-portion quality monitoring of certain food products as well as a detection of different food products in order to then either distribute correct portions PO of the food products to different discharge and distribution belts 13, 14 at belt conveyor 21 to 24 in the sense of a sorting process and/or to discharge faulty portions PF of the food products onto an associated distribution belt 14 and/or into a collection container 15.

The longitudinal adjustment of deflection element 4 in direction of transport T or in a direction opposite thereto results in a variety of adjustment options for optimizing the production output for different food products. Suitable actuation motions of deflection element 4 and/or deflection roller 3 for moving to distribution position SV can be programmed with the aid of the control unit 8 and, if necessary, be continuously adapted to the respective requirements during the production operation.

Instead of first and/or second intermediate roller 4a, 4b, deflection element 4 can comprise at least one stationary (non-rotating) deflection surface/sliding surface with a suitable curvature for guiding/deflecting conveyor belt 1 at the transition between first and second longitudinal sections L1, L2.

The invention claimed is:

1. A belt conveyor for portioned food products comprising a conveyor belt with a drive roller, with a deflection roller which can be adjusted upwardly and/or downwardly relative thereto and relative to a direction of transport that is assumed to be horizontal, and with an upper run extending therebetween for transporting said food products, comprising a deflection element which is arranged in a vertically fixed position between said drive roller and said deflection roller and can be adjusted in a direction of transport and at which said upper run and/or an associated lower run of said conveyor belt transitions from a first longitudinal section extending in said direction of transport to a second longitudinal section angled relative thereto upwardly/downwardly when said deflection roller has been adjusted upwardly/downwardly.

2. The belt conveyor according to claim 1, where said deflection element comprises a first intermediate roller for deflecting said upper run and/or a second intermediate roller for deflecting said lower run.

3. The belt conveyor according to claim 2, where said first and said second intermediate roller are arranged such that they can be adjusted individually or together in said direction of transport.

4. The belt conveyor according to claim 1, furthermore with an actuating drive for adjustment of said deflection element by machine in said direction of transport.

5. The belt conveyor according to claim 1, furthermore with a position-controlled actuating drive for said deflection roller for moving to a programmable setting angle of said second longitudinal section.

6. The belt conveyor according to claim 1, furthermore with a mechanical stop for limiting a setting angle of said second longitudinal section.

7. The belt conveyor according to claim 6, wherein the mechanical stop is adjustable.

8. The belt conveyor according to claim 1, with a pivoting mechanism for adjusting said deflection roller.

9. The belt conveyor according to claim 1, furthermore with a programmable control device for selectively operating said drive roller at at least two different transport speeds.

10. The belt conveyor according to claim 1, where said conveyor belt is configured to be elastic, such that its length adapts to a change in length of its upper run or lower run caused when said second longitudinal section is adjusted.

11. The belt conveyor according to claim 10, wherein the conveyor belt is configured as an elastomer strap.

12. The belt conveyor according to claim 1, where said conveyor belt is configured as a link chain that is rigid transverse to said direction of transport.

13. The belt conveyor according to claim 1, where said second longitudinal section can be angled downwardly and is arranged downstream of said first longitudinal section, or where said second longitudinal section can be angled upwardly and is arranged upstream of said first longitudinal section.

14. A distribution device with the belt conveyor according to claim 1 and with an upstream inspection conveyor for inspecting said food products during their transportation, and with a control device for adjusting said deflection roller and/or said deflection element in an automated manner and in dependence of an inspection result of said inspection conveyor.

15. The distribution device according to claim 14, with said belt conveyor, and with a collection container positioned downstream thereof when said second longitudinal section is angled.

16. The distribution device according to claim 14, with said belt conveyor, with a first discharge belt positioned downstream thereof when said second longitudinal section is not angled, and with a second discharge belt/distribution belt positioned downstream when said second longitudinal section is angled.

17. The distribution device according to claim 14, wherein the upstream inspection conveyor comprises a continuous scale and/or a camera and/or a scanner.

* * * * *